United States Patent [19]
Barkey et al.

[11] 3,879,341
[45] Apr. 22, 1975

[54] DYEING POLYESTERS

[75] Inventors: Kenneth T. Barkey; Douglas C. May, both of Rochester, N.Y.

[73] Assignee: Eastman Kodak Company, Rochester, N.Y.

[22] Filed: Aug. 31, 1972

[21] Appl. No.: 285,397

[52] U.S. Cl................................................ 260/40 P
[51] Int. Cl............................................ C08g 51/04
[58] Field of Search........................ 260/40 R, 40 P

[56] References Cited
UNITED STATES PATENTS

| | | | |
|---|---|---|---|
| 2,571,319 | 10/1951 | Waters et al. | 260/40 P |
| 2,837,437 | 6/1958 | Finloyson et al. | 106/198 |
| 3,359,230 | 12/1967 | Bowman et al. | 260/40 R |
| 3,417,048 | 12/1968 | Cooper et al. | 260/40 R |
| 3,487,041 | 12/1969 | Okuzumi | 260/40 P |
| 3,496,133 | 2/1970 | Hoffman | 260/40 P |
| 3,600,354 | 8/1971 | Kunze et al. | 260/40 R |
| 3,694,402 | 9/1972 | Essam | 260/40 P |

*Primary Examiner*—Donald E. Czaja
*Assistant Examiner*—S. M. Person
*Attorney, Agent, or Firm*—E. W. Milan

[57] ABSTRACT

A dye concentrate for dyeing polyesters is prepared by mixing a dye and a relatively small amount of the polyester to be dyed. The mixture is then heated to heat-set the mixture. By so doing, satisfactory feed rates can be maintained to an extruder to allow usable film products to be made.

17 Claims, No Drawings

DYEING POLYESTERS

FIELD OF THE INVENTION

This invention relates generally to the dyeing of high-melting polymers and more particularly to the dyeing of polyesters.

BACKGROUND OF THE INVENTION

It has been suggested that polyesters such as poly(ethylene terephthalate) may be dyed by rolling polyester pellets and the dye together on a pair of compression rollers, which rollers are heated to a temperature at which the polyester becomes soft and pliable. This method has not been entirely satisfactory because very careful temperature control is required in order that the polyester is not degraded and/or oxidized. Temperature and oxidative degradation results in a lowering of the molecular weight and formation of uncontrolled levels of objectionable color which makes it difficult to form films therefrom that are useful products.

Other methods for dyeing polyesters, such as by mixing a powdered dye with a powdered polyester, fail to give satisfactory results, even though the two compounds are ground together to a fine powder. When attempts are made to extrude such a ground blend, severe feed instability is experienced with the attendant inferior flow properties. When melting such a blend, the melting and extrusion equipment becomes contaminated with the dyes, which equipment is difficult to clean, thereby increasing the cost of dyeing polyesters.

It has also been suggested that the dye be mixed with one of the components used in forming the polyester, i.e. the glycol component. While an excellent mixture can be obtained with the glycol, the dye sometimes agglomerates during the ester interchange reaction used in making the polyester. Another disadvantage is that most soluble dyes are relatively unstable to thermal conditions necessary to make the polyester. Change of dye color often results when the dye decomposes. Polyesterification rates may also be adversely effected.

The polyesters in which the problem solved by the present invention exists and to which the present invention relates are high molecular weight linear polyesters obtained by an ester interchange reaction of a dihydric alcohol with a dibasic saturated fatty carboxylic acid or derivatives thereof. Suitable dihydric alcohols for use in preparing polyesters are well known in the art and include any glycol wherein at least one of the hydroxyl groups is on the terminal carbon atom and contain between 2 to 12 carbon atoms such as, for example, ethylene glycol, propanediol, trimethylene glycol, hexamethylene glycol, decamethylene glycol, dodecamethylene glycol, and 1,4-cyclohexane dimethanol. Aliphatic or aromatic dibasic acids that can be employed in preparing polyesters are well known in the art and include those dibasic acids containing from 2 to 16 carbon atoms. Specific examples of suitable dibasic acids include adipic acid, sebacic acid, isophthalic acid, terephthalic acid, and cyclohexanedicarboxylic acid. The alkyl esters of the above-mentioned acids can also be employed satisfactorily. Other suitable dihydric alcohols and dibasic acids that can be employed in preparing polyesters from which film can be prepared are described in U.S. Pat. No. 2,720,503.

Specific preferred examples of polyester resins which can be used in this invention are poly(ethylene terephthalate), poly(cyclohexylene-1,4-dimethylene terephthalate); the latter polyester is derived from reducing dimethyl terephthalate to 1,4-cyclohexanedimethanol and reacting with dimethyl terephthalate, as set forth in U.S. Pat. No. 2,901,466. Modifiers which include either or both of glycols and/or diacids or diesters that are aliphatic, aromatic and alkaryl are included for these two specific homopolyesters.

SUMMARY OF THE INVENTION

It is therefore an object of the present invention to provide a dye concentrate for dyeing polyesters. It is another object of this invention to provide a method by which high molecular weight linear polyesters may be dyed. Another object of this invention is to provide a polyester and dye concentrate that can be blended with polyester and formed into dyed fibers, films, sheets, and the like.

These and other objects and advantages of this invention are accomplished by mixing a dye and a relatively small amount of the polyester to be dyed. The mixture or blend is then heated to a temperature of about 120° to 220°C and held at this temperature for about one and a half to two hours to heat-set the blend.

DETAILED DESCRIPTION OF A PREFERRED EMBODIMENT

In the preferred embodiment the polyester is poly(ethylene terephthalate) produced by an ester interchange reaction from ethylene glycol and dimethyl terephthalate. Other polyesters such as those indicated hereinbefore may be dyed by this invention.

To dye the polyester film fiber, etc., a dye-polyester mixture, blend or concentrate is prepared. The dye-polyester concentrate is then blended or mixed in the desired proportions with the polyester as will be discussed hereinafter. The greater the dye concentration the greater is the importance of this invention.

The dye concentrate is prepared by making a dry mix of powdered dye with a granulated polyester of substantially the same type that is to be dyed. The dye is in an amount of from above zero to about 10 weight percent or 100,000 ppm based on the weight of the polyester. Ordinarily, for most applications dye concentrates of 2.0 to 6.0 percent are used. If the entire polymer is to be dyed by the heat setting technique of this invention, then any concentration up to about 10 percent is economically feasible. The mixing can be accomplished in a conventional type mixer such as a sigma-blade mixer, fluidizer, or by means of a high speed blender such as a Waring Blender. The blending or mixing action causes the dye to be uniformly distributed among the particles of the polyester and partially to adhere thereto.

The dry mix of dye and polyester is then placed in an oven or other heating device, such as an externally-heated fluidizer, capable of fluidizing the polyester-dye mixture with an inert gas such as nitrogen. The mix or blend is heated to a temperature of from about 120° to about 220°C for a period of from about 1½ about 2 hours to heat set the blend of dye and polyester. The temperature is dictated by the softening points of the dye and polyester. For best results the temperature should not be close to the melting point of the polyester; i.e., about 220°C is maximum for poly(ethylene terephthalate). Above this temperature the polyester tends to agglomerate. The dye should soften or melt at the same temperatures. If the temperature is too low,

3 the dye does not penetrate into the polyester to a sufficient degree.

By heating the blend of dye and polyester resin it was found that the dyes could be diffused into the resin at concentrations of 5.5% to the extent that 90–93% of the dye cannot be extracted from the blend with a solvent such as methylene chloride in which the dye is soluble.

The heat-set blend or concentrate can be mixed with the main body of polyester resin in any conventional mixer or it may be added to the resin which is in turn added to the feed section of conventional melting equipment, as for example, the feed section of a screw extruder in which the resin and dye concentrate are thoroughly mixed and melted in order that the dyed resin may be extruded as film, sheet, etc.

The dyes that can be blended with the polyester resin are the conventional dyes which are compatible with the resin. As for example, those dyes disclosed in U.S. Pat. Nos. 3,034,847; 3,359,230; 3,417,048; and 3,622,582 may be used. Among the other dyes which may also be used are the following: 1,5-bis (1,2,4-triazol-5-ylthio)anthraquinone; 2,2'-bis[4(2,2-dicyanovinyl)-N-ethyl-3-toluidino]diethyl sulfone; 2,2'-bis[4(2,2-dicyanovinyl-N-ethyl anilino]diethyl isophthalate; N,N'-bis[2{4-(2,2-dicyanovinyl)-N-ethyl-3-toluidino } ethyl] terephthalamide; 2,2'-bis[4(2,2-dicyanovinyl)-N-ethyl-3toluidino] diethyl succinate; 2,2'-bis[4(2,2-dicyanovinyl)-N-ethyl-3-toluidino]diethyl adipate; 2,6-bis(2-quinolyl)-s-hydrindacene-1,3,5,7-tetrone; 2-(2-quinolyl)-1,3-indandione-5,6-dicarboxylic anhydride; and 2(3-hydroxyquinol-2-yl)-1,3-indandione.

This invention will be further described by reference to the following examples.

EXAMPLE I

Poly(ethylene terephthalate) resin of about 20,000 number average molecular weight and an inherent viscosity of about 0.62 and a yellow dye, 2-(2-quinolyl)-1,3-indandione were blended. The blend was heated and then extracted with methylene chloride to determine the percentage of dye retained. The following Table I indicates the duration and temperature of the heat treatment, the means used for the heat treatment, the concentration of the dye and the percentage retention.

Table I

| Sample | Dye Concentration, ppm in Resin | °C Temp. | Heater | Time(min) | % Dye Retention |
|---|---|---|---|---|---|
| 1 | 5500 | no heating | | no heating | 10.5 |
| 2 | 5500 | 115 | oven | 90 | 38 |
| 3 | 5500 | 115 | oven | 1720 | 73.8 |
| 4 | 5500 | 127 | oven | 30 | 25 |
| 5 | 5500 | 127 | oven | 90 | 66.3 |
| 6 | 5500 | 150 | oven | 90 | 91.2 |
| 7 | 5500 | 184 | oven | 90 | 93 |
| 8 | 27500 | 167 | oven | 90 | 97.7 |
| 9 | 55000 | 168 | oven | 90 | 92.5 |

EXAMPLE II

The resin and dye of Example I were blended in a fluidizer with the dye being present in a concentration of 55,000 ppm of resin. The blend was heated at the temperatures and for the times specified in Table II. The heat-set blend was then extracted with methylene chloride to determine the percent dye retention.

Table II

| Sample | Temperature °C | Time(min.) | % Dye Retention |
|---|---|---|---|
| 10 | 182 | 0 | 35 |
| 11 | 182 | 30 | 78.8 |
| 12 | 182 | 60 | 94 |
| 13 | 182 | 90 | 94.7 |
| 14 | 182 | 120 | 98.5 |
| 15 | 23 | 0 | 43 |
| 16 | 176 | 30 | 88 |
| 17 | 176 | 60 | 97 |
| 18 | 176 | 120 | 97.7 |

EXAMPLE III

The resin and dye blend of Example II was heated in a fluidizer for 90 minutes at a temperature of 182°C. The blend was then mixed with additional polyester resin to arrive at a dye concentration of 5500 ppm. This mixture was extruded in a conventional extruder and the product obtained was extracted with methylene chloride. The percentage of dye retention was 92.8%. When the dye was not heat set, it was impossible to maintain a satisfactory feed to the extruder and as a result no usable film was made.

It can be seen from the foregoing that heating the dye and polyester blend for a sufficient period of time results in a substantial increase in the amount of dye retained. As a result a satisfactory feed to the extruder was obtained which allowed a usable film to be produced.

The invention has been described in detail with particular reference to preferred embodiments thereof, but it will be understood that variations and modifications can be effected within the spirit and scope of the invention.

What is claimed is:

1. In a process for making a uniformly dyed polyester article using a dry dye concentrate comprising powdered meltable or heat softenable dye with a granulated polyester resin of the type of additional polyester to be dyed, said dye being compatible with said polyester and being present in said mix in an amount of from about 2 to about 10 weight percent, based on the weight of said polyester, blending said dye concentrate with said additional polyester to form an extrudable mixture, and extruding said mixture by means of a screw extruder, the improvement in which extruder feed screw instability of the mixture due to the presence of the meltable dye is overcome by the method comprising:

providing as the dye used to make said dye concentrate a heat stable dye which has its softening or melting point below the agglomerating temperature of said polyester and which is heat diffusible into said resin below said agglomerating temperature, uniformly mixing said dye with said polyester particles to form a dry mix, heating said dry mix at a dye diffusing temperature at least sufficient to soften or melt the dye but not sufficient to agglomerate said granulated polyester, and continuing said heating, for a period of time (a) at least sufficient to heat diffuse substantially all of said softened or melted dye into said granulated polyester and (b) at least sufficient to heat-set the dye to the extent that at least about 90% of the dye cannot be extracted from the concentrate with a solvent for said dye, thereby forming a dry dye-polyester resin concentrate containing diffused and heat-set dye which can be blended with said additional polyester and extruded from a screw extruder free of said feed screw instability.

2. A process according to claim 1 comprising heating said dry mix to a temperature above the softening point of the dye and below about 220°C. for from about 1 hour to about two hours.

3. A process according to claim 2 wherein said temperature is maintained for about two hours at about 180°C., and said dye is 2-(2-quinolyl)-1,3-indandione.

4. A process according to claim 2 wherein said polyester is poly(ethylene terephthalate).

5. A process for uniformly dyeing a quantity of polyester resin to be dyed comprising
   1. forming a dye-polyester concentrate of a portion of said polyester with a predetermined amount of dye according to the process of claim 2
   2. uniformly blending said concentrate with an additional amount of said polyester resin sufficient to provide a desired dye concentration in the blend, and
   3. melting the resulting blend.

6. A process according to claim 5 wherein said polyester is poly(ethylene terephthalate).

7. A process according to claim 5 wherein said temperature is maintained for about two hours at about 180°C.

8. A process according to claim 6 wherein the dye is 2-(2-quinolyl)-1,3-indandione.

9. A process according to claim 1 wherein the dye is 2-(2-quinolyl)-1,3-indandione; 1,5-bis(1,2,4-triazol-5-ylthio)-anthraquinone; 2,2'bis[4(2,2-dicyanovinyl)-N-ethyl-3-toluidino] diethyl sulfone; 2,2'-bis[4(2,2-dicyanovinyl)-N-ethyl anilino] diethyl isophthalate; N,-N'-bis[2-{4-(2,2-dicyanovinyl)-N-ethyl-3-toluidino} ethyl] terephthalamide; 2,2'-bis[4(2,2-dicyanovinyl) N-ethyl-3-toluidino] diethyl succinate; 2,2'bis[4(2,2-dicyanovinyl) -N-ethyl-3-toluidino] diethyl adipate; 2,6-bis(2-quinolyl)- s-hydrindacene-1,3,5,7-tetrone; 2-(2-quinolyl)-1,3-indandione-5, 6-dicarboxylic anhydride; or 2(3-hydroxyquinol-2-yl)-1,3-indandione.

10. A process according to claim 5 wherein the dye is 2-(2-quinolyl)-1,3-indandione; 1,5-bis(1,2,4-triazol-5-ylthiol, anthraquinone; 2,2'-bis[4(2,2-dicyanovinyl)-N-ethyl-3-toluidino]diethyl sulfone; 2,2'-bis[4(2,2-dicyanovinyl)-N-ethyl anilino]diethyl isophthalate; N,N'-bis[2- 4-(2,2dicyanovinyl)-N-ethyl-3-toluidino ethyl]terephthalamide; 2,2'-bis[4(2,2-dicyanovinyl)- N-ethyl-3-toluidino]diethyl succinate; 2,2'-bis[4-(2,2-dicyanovinyl)-N-ethyl-3-toluidino]diethyl adipate; 2,6-bis (2-quinolyl)-s-hydrindacene-1,3,5,7-tetrone; 2-(2-quinolyl)-1, 3-indandione-5,6-dicarboxylic anhydride; or 2(3-hydroxyquinol-2-1,3,-indandione.

11. A uniformly dyed polyester article made according to the process of claim 1.

12. A process for 1a uniformly dyed self-supporting polyester film article comprising (-) forming a dry dye polyester concentrate containing diffused and heat-set dye by a method which comprises (i) forming a dry mix by uniformly mixing a portion of a body of dry particles of polyester resin to be dyed with from about 2 to about 10 weight percent, based on the weight of said portion of polyester, of dry powdered heat-stable dye which is softenable or meltable and diffusible into said polyester in the temperature range of from about 150° to 220°C and compatible with said polyester resin, said polyester essentially having a melting point above the melting point of the dye, (ii) heating the dry mix with mixing at a dye diffusing temperature in said range for a period of time at least sufficient to diffuse substantially all of the dye into said resin but not sufficient to melt the polyester, (iii) maintaining the resulting diffused dye-polyester concentrate at said temperature for an additional period of time sufficient to heat-set the dye in the polyester particles to the extent that at least about 90% of the dye cannot be extracted from the concentrate with a solvent for said dye, (2) uniformly blending said concentrate with the remainder of the polyester resin to be dyed, (3) heating the resulting blend to form a uniformly dyed melted extrudable mass, and (4) extruding said mass from a screw extruder to form said article.

13. A process according to claim 12 wherein the polyester is poly(ethylene terephthalate).

14. A process according to claim 12 wherein the dye-polyester concentrate contains from about 2.0 to about 6 weight percent of dye.

15. A uniformly dyed self-supporting polyester film article made according to the process of claim 12.

16. A process according to claim 12 wherein the dye is 2-(2-quinolyl)-1,3-indandione; 1,5-bis(1,2,4-triazol-5-ylthio)-anthraquinone; 2,2'-bis[4(2,2-dicyanovinyl)-N-ethyl-3-toluidino] diethyl sulfone; 2,2'-bis[4(2,2-dicyanovinyl)-N-ethyl anilino] diethyl isophthalate; n,-n'-bis[2;{4-(2,2-dicyanovinyl)-N-ethyl-3-toluidino } ethyl] terephthalamide; 2,2'-bis[4(2,2-dicyanovinyl)-N-ethyl-3-toluindino] diethyl succinate; 2,2'-bis[4(2,2-dicyanovinyl)-N-ethyl-3-toluidino]diethyl adipate; 2,6-bis (2-quinolyl)-s-hydrindacene-1,3,5,7-tetrone; 2-(2-quinolyl)-1,3-indandione-5,6-dicarboxylic anhydride; or 2(3-hydroxyquinol-2-yl)-1,3-indandione.

17. The process of claim 12 wherein the dye is 2-(2-quinolyl)-1,3-indandione.

* * * * *

UNITED STATES PATENT OFFICE
CERTIFICATE OF CORRECTION

PATENT NO. : 3,879,341
DATED : April 22, 1975
INVENTOR(S) : Kenneth T. Barkey and Douglas C. May It is certified that error appears in the above-identified patent and that said Letters Patent are hereby corrected as shown below:

Col. 2, line 59, After "1½" insert --to--.

Col. 6, line 3 should read --2(3-hydroxyquinol-2-yl)-1,3-indandione.--

Col. 6, line 6, "1a" should be --making--.

Col. 6, line 7, "(-)" should be --(1)--.

Signed and Sealed this ninth Day of September 1975

[SEAL]

Attest:

RUTH C. MASON
Attesting Officer

C. MARSHALL DANN
Commissioner of Patents and Trademarks